US010514845B1

(12) United States Patent
Hamilton et al.

(10) Patent No.: US 10,514,845 B1
(45) Date of Patent: Dec. 24, 2019

(54) PASSWORD CAPABILITY USING COLOR KEYS FOR MOBILE DEVICE

(71) Applicants: Nancy Elizabeth Hamilton, Mesa, AZ (US); Michael Alan Brady, Mesa, AZ (US)

(72) Inventors: Nancy Elizabeth Hamilton, Mesa, AZ (US); Michael Alan Brady, Mesa, AZ (US)

( * ) Notice: Subject to any disclaimer, the term of this patent is extended or adjusted under 35 U.S.C. 154(b) by 181 days.

(21) Appl. No.: 15/613,247

(22) Filed: Jun. 4, 2017

Related U.S. Application Data

(63) Continuation-in-part of application No. 15/150,431, filed on May 10, 2016, which is a continuation-in-part of application No. 14/120,531, filed on Jul. 26, 2014, now abandoned.

(51) Int. Cl.
| | |
|---|---|
| *G06F 3/0489* | (2013.01) |
| *G06F 3/0488* | (2013.01) |
| *H04M 1/725* | (2006.01) |
| *H04W 12/08* | (2009.01) |
| *H04L 29/08* | (2006.01) |

(52) U.S. Cl.
CPC ........ *G06F 3/0489* (2013.01); *G06F 3/04886* (2013.01); *H04M 1/72519* (2013.01); *H04W 12/08* (2013.01); *H04L 67/306* (2013.01)

(58) Field of Classification Search
CPC .................................................... G06F 3/0489
USPC .......................................................... 715/773
See application file for complete search history.

(56) References Cited

U.S. PATENT DOCUMENTS

| | | | | |
|---|---|---|---|---|
| 6,924,792 B1* | 8/2005 | Jessop | ................... | G02B 26/004 345/105 |
| 7,002,553 B2* | 2/2006 | Shkolnikov | ........... | G06F 1/1626 345/158 |
| 7,310,080 B2* | 12/2007 | Jessop | ................... | G02B 26/004 345/105 |
| 7,844,825 B1* | 11/2010 | Neginsky | ................ | G06F 21/83 713/184 |
| 9,009,814 B1* | 4/2015 | Wertz | ...................... | G06F 21/36 713/168 |
| 9,285,836 B2* | 3/2016 | Griffin | ................ | G06F 3/04886 |
| 9,536,069 B1* | 1/2017 | Shah | ........................ | G06F 21/31 |
| 9,544,383 B1* | 1/2017 | Calkins | ................... | H04L 67/24 |
| 9,547,419 B2* | 1/2017 | Yang | ...................... | G06F 3/0482 |
| 9,740,884 B2* | 8/2017 | Hawkins | ................. | G06F 21/64 |
| 10,102,366 B2* | 10/2018 | Finnan | ................... | G06F 21/31 |
| 2004/0034801 A1* | 2/2004 | Jaeger | .................. | G06F 3/0481 726/6 |
| 2009/0128492 A1* | 5/2009 | Yoo | ........................ | G06F 3/0202 345/168 |
| 2010/0060585 A1* | 3/2010 | Chiu | .................... | G06F 3/04886 345/168 |
| 2011/0105193 A1* | 5/2011 | Lee | ........................ | G06F 3/0488 455/566 |

(Continued)

*Primary Examiner* — Jason C Olson

(57) ABSTRACT

The usage of a new key on an existing keyboard that would have the symbol of a lock on it that when used in conjunction with other keys, such as, an alphabetical key, a number key, a symbol key, and/or an alpha character key when clicked would result in showing a color keyboard on an existing cellular telephone or mobile device would help the user or owner of the telephone to create or type a complicated password to gain access to the various functions of the cellular device.

5 Claims, 8 Drawing Sheets

(56) References Cited

U.S. PATENT DOCUMENTS

| | | | | |
|---|---|---|---|---|
| 2012/0159592 A1* | 6/2012 | Griffin | ................... | G06F 21/36 |
| | | | | 726/7 |
| 2014/0013416 A1* | 1/2014 | Chae | ...................... | G06F 21/36 |
| | | | | 726/16 |
| 2014/0043239 A1* | 2/2014 | Agrawal | ............ | G06F 3/04886 |
| | | | | 345/169 |
| 2014/0310805 A1* | 10/2014 | Kandekar | ............... | G06F 21/36 |
| | | | | 726/19 |
| 2015/0277686 A1* | 10/2015 | LaForge | ............... | G06F 3/0484 |
| | | | | 715/723 |
| 2016/0034178 A1* | 2/2016 | Yoon | ................... | G06F 3/04886 |
| | | | | 715/760 |
| 2016/0344720 A1* | 11/2016 | Nayak | ................... | H04L 63/083 |
| 2016/0358311 A1* | 12/2016 | Chen | .................... | G06F 17/214 |
| 2018/0217732 A1* | 8/2018 | Wang | ................... | G06F 1/1643 |

\* cited by examiner

[S] + ■ + [P] + [A] + ■ + [R] + [K] + ■ + [Y] + ▨ + [2] + [3] + ▨ + [!]

SPARKY23!

FIG. 6

PASSWORD CAPABILITY USING COLOR KEYS FOR MOBILE DEVICE

CROSS-REFERENCE TO RELATED APPLICATIONS

This application is a continuation in part of U.S. application Ser. No. 15/150,431 to Nancy E. Hamilton, filed on May 16, 2016 and entitled "Password Help Using Color Keys" which is a continuation in part of U.S. application Ser. No. 14/120,531 to Nancy E. Hamilton, filed on May 31, 2014 and entitled "Password Help Using Color Keys" the contents of which are hereby incorporated by reference in their entirety.

| U.S. PATENT DOCUMENTS | | | |
|---|---|---|---|
| US-7,310,080 B2 | December 2007 | Jessop, Richard | 11/130,432 |
| US-7,002,553 | February 2006 | Shkolnikov, Mark | 10/895,967 |
| US-6,924,792 B1 | October 2005 | Jessop, Richard | |
| US-9,547,419 B2 | January 2017 | Yang, Lawrence Y. | 14/839,913 |
| US-20160358311 A1 | December 2016 | Chen, Kevin Will | 14/329,889 |
| US-20100060585 A1 | March 2010 | Chiu, Hung Che | 12/542,749 |
| US-20160034178 A1 | February 2016 | Yoon, Joohyun | 12/344,050 |

STATEMENTS REGARDING FEDERALLY SPONSORED RESEARCH OR DEVELOPMENT "NOT APPLICABLE" THE NAMES OF THE PARTIES TO A JOINT RESEARCH AGREEMENT "NOT APPLICABLE"

Incorporation-by-Reference of Material Submitted on a Compact Disc or as a Text File Via the Office Electronic Filing System (EFS-Web)

BACKGROUND OF THE INVENTION

Technical Field

Cellular Devices

Background Art

The cellular telephone has become a $21^{st}$ century phenomena the world over. People of all ages, races, and nationalities use the mobile device. The cell phone has become an integral part of the lives of people in the world.

The cellular telephone composes various technological elements. Many companies like Apple, Samsung, Nokia, Sony, L G, and Motorola, create, make, distribute, and sell for profit the cellular telephone. These companies currently supply telephones to the world.

A person, young or old, can manipulate the keys on the phone to call another person, text a message, write, send, and read electronic messages (i.e. emails), look up data on the worldwide internet, listen to music, watch movies and videos, play electronic games, and purchase items. What are currently known as "apps" are another feature of the telephone. People can use a free app or purchase one over the telephone. These apps provide access to the many uses of the cell phone.

Access to the world-wide internet is also a feature of the cellular device. Commerce is created once a user buys an object from an online company by using the cell phone. People can access their financial accounts, make payments, order items, read data, and look up locations and get directions.

This mobile, cellular device has transformed the daily activities for people the world over and for the future of communication between humans.

Therefore, the accessibility to the internet and the functions of the cell phone cause an astounding chance that unscrupulous individuals can access the hand-held device and cause difficulties for the owner. What is commonly known as "hackers" gain access to the functions of the telephone. These hackers steal from the individual, companies, and governments through the world-wide web; the internet. There is a paramount necessity to derail these thieves.

BRIEF SUMMARY OF THE INVENTION

The idea is to encapsulate on an existing cellular device. At present, individuals gain access to the various functions of the telephone though the use of a username and a password. There is a prompt to enter a person's user name and password on the system. These prompts allow a cellular owner to enter a series of alphabetical letters, numbers, and alpha characters that they have created in the form of a password.

The idea "Password Capability Using Color Keys for a Mobile Device" is an extension of the alphabetic, the numbers, and the alpha character's keyboards that are already in existence on a cellular telephone. The newest feature would be a color keyboard. The color keys on a color keyboard would enable a user to make a more complicated password.

On an existing keyboard there would be a key that would have a small symbol of a lock. It could be highlighted in any color or not to encourage a user to use the key. Once a person clicks on the lock key a keyboard of colors would appear. There would be a wide choice of colors to choose form. The primary colors; red, blue, and yellow and the secondary colors of green, orange, and purple would be available. Because of the nature of colors to be light and dark, the primary and secondary colors would also have their counterparts in light and dark shades. This combination would allow the cellular phone user to use these colors. There is also a key of black and gray.

The manner in how the idea would work would be to simply click on a letter, number, or alpha character first, touch the lock key and then choose a color to create the code. The code would be visible or not depending on the cellular phone device.

This would further enable a user to create a more complicated password. This idea would coincide with another idea using a similar color coded way of creating a password. See application Ser. No. 15/150,431 Hamilton, N "Password Help Using Color Keys".

Because of the complicated nature of this system, a user would have to have a way to remember their password. The simple technique would be write down the password using colored pens or markers and then keep the password in a secure location. The use of the password could become second nature to the cell phone user. The password could be less characters than the present length of a password of eight or more.

BRIEF DESCRIPTION OF THE SEVERAL VIEWS OF THE DRAWINGS

FIG. 6 Depicts an example of a password using color keys.

FIG. 8 Depicts the same cellular telephone showing the user name and password that has been typed in.

DETAILED DESCRIPTION OF THE INVENTION

A new feature to the already existing cellular telephone or mobile device is to add an additional key that has the shape of a lock on it that would, when touched, show a new screen that has a colored keyboard on it. These color keys would enable the user to gain access to the various functions of the telephone by helping to create complicated passwords.

The color keys would be coded into the telephone to create sensitive passwords much like the colors that are used for application Ser. No. 15/150,431 Hamilton, Nancy E. "Password Help Using Color Keys", that describes how color keys would play an integral part in the formation of secure passwords.

Figure 1:
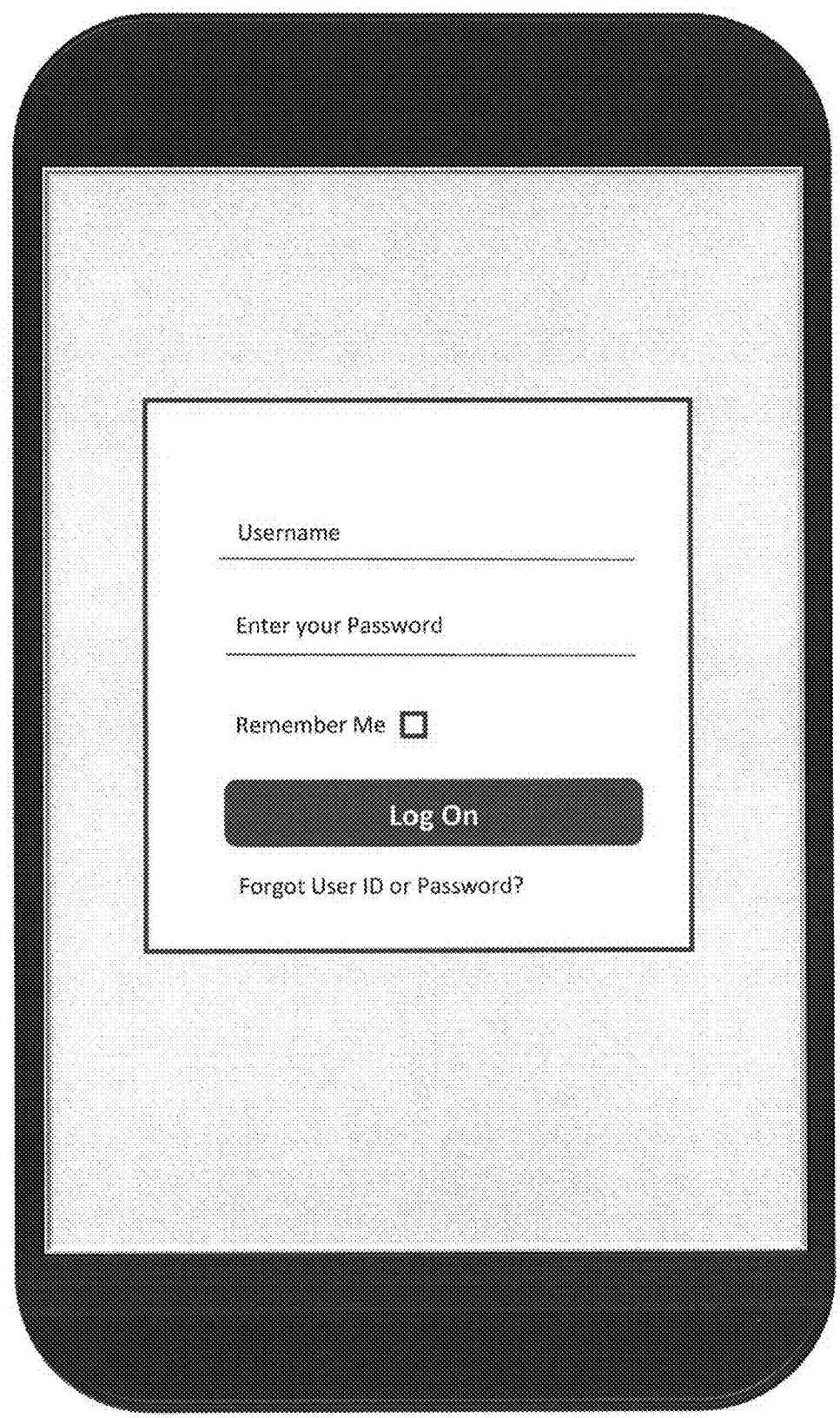
FIG. 1 Depicts a cellular telephone with the prompt to enter a username and a password screen.

FIG. 1 depicts a cellular telephone or mobile device. It shows a screen that is used to gain access into the web site portal. Currently, a person would enter their user name and a password. To gain access the user would press "Log On". That means that the telephone will allow access if the user name and password is correct.

Figure 2:
FIG. 2 Depicts the same cellular device with an alphabetical keyboard screen that includes a lock key.
Figure 3:
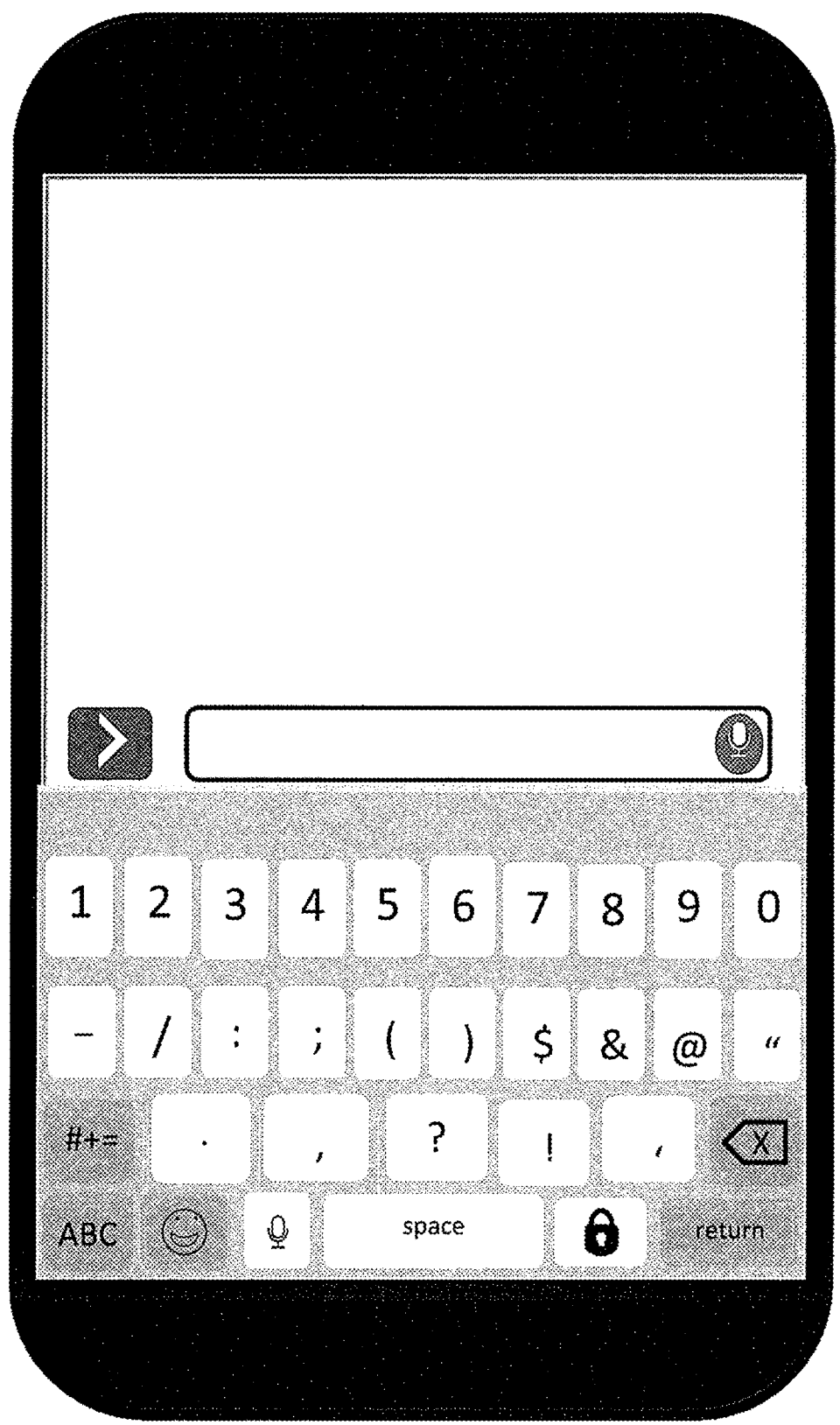
FIG. 3 Depicts the same cellular device with a number and symbol keyboard screen that includes a lock key.

With the use of the user name and password, another screen would appear (FIG. 2). The first to appear would be an alphabetical keyboard. This keyboard allows the telephone user to type letter in lower and upper case letters when clicking on the upward arrow.

The keyboard also allows a user to choose to use a number in a message. The user would click or press the "1 2 3" key on the initial keyboard as seen in FIG. 1. Also, there is a little smiley face, as it is commonly known. When that face is clicked, a series of something called "emojis" appear. These emojis allow the user to attach little pictures to accentuate and convey certain feelings. Usually an emgie would be a smiley face.

Next to the smiley face is a microphone image. This allows the user to enter dictation, which means that a user of the mobile device can use their voice to send dictation and to send contacts and locations so that the company that makes the device, example: Apple, can process a request.

The "space" bar, which is commonly seen on a typewriter or computer keyboard is a mechanism that puts a space between letters, words, sentences, and paragraphs. The "return" button next to a "lock" key that can be seen in FIG. 2, FIG. 3, FIG. 5, and FIG. 7, puts spaces between messages or sentences.

Figure 5:
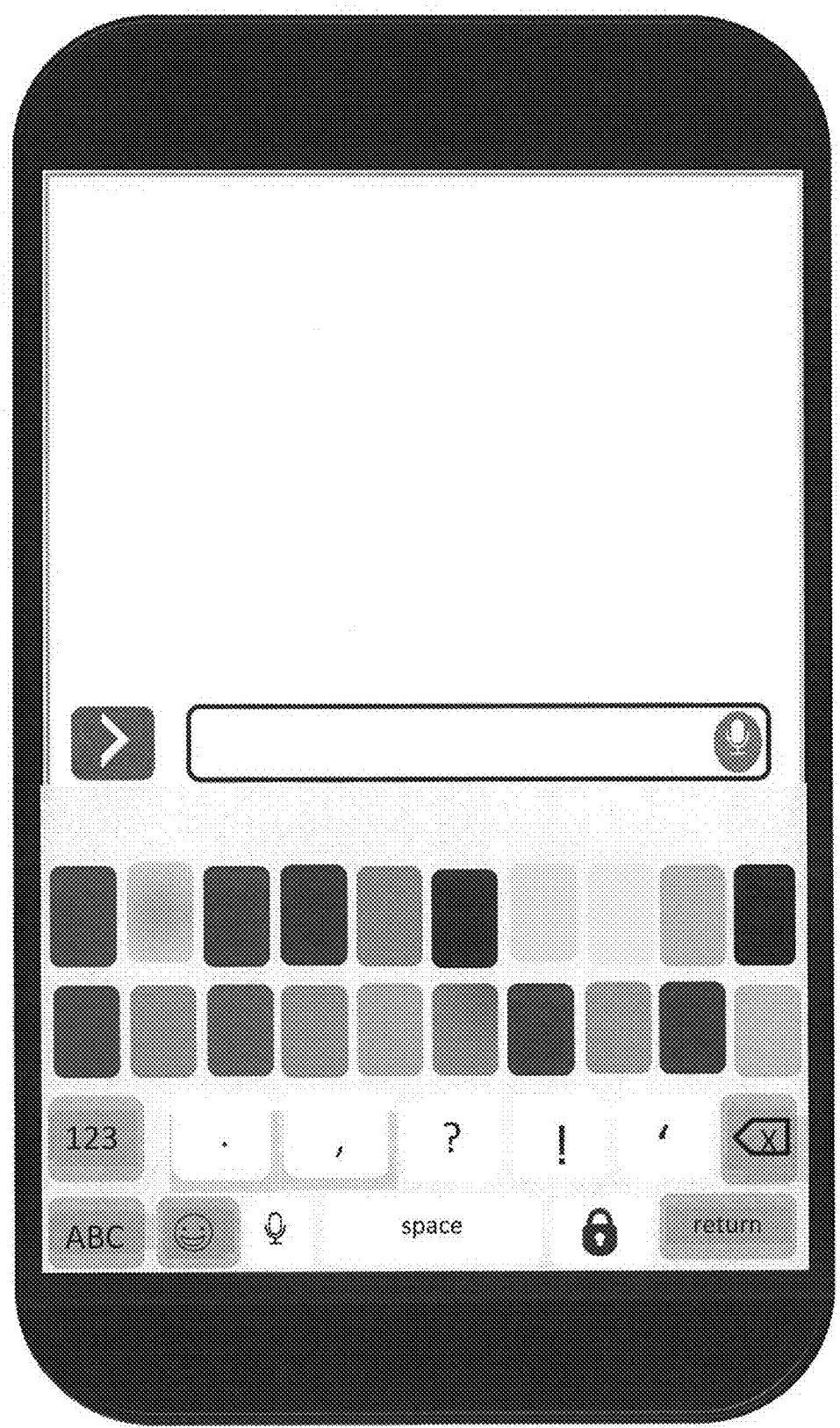
FIG. 5 Depicts the same cellular telephone with a color keyboard and symbols screen that includes a lock key.
Figure 7:
FIG. 7 Depicts the same cellular telephone with an example of a password on the screen.

The invention is to place a "lock" key between the space and return buttons. This would enable the user to access another screen, FIG. 5. In FIG. 5, you will see a series of colors. These colors are the primary colors, red, blue, and yellow and the secondary colors, green, orange, and purple. The keyboard is essentially the same as the alphabetic, number, and alpha character screens but with color keys.

The primary colors, red, blue, and yellow and the secondary colors, green, orange, and purple are placed such that each color has a light and dark shade. These colors make a more complicated password once used. There is a black and gray key also.

Figure 4:
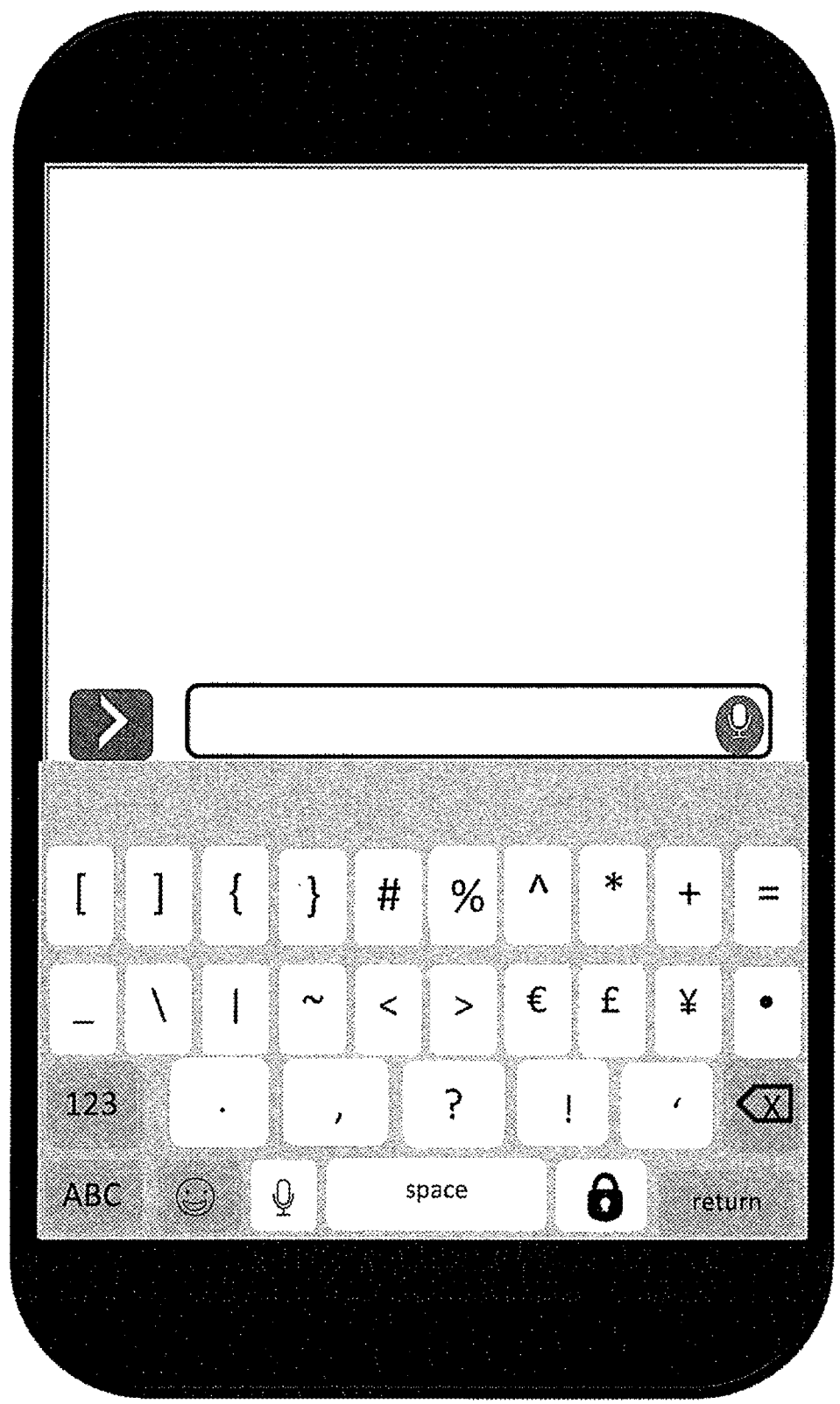
FIG. 4 Depicts the same cellular telephone with an alpha character keyboard and symbols screen that includes a lock key.

In FIG. 5 you will notice that the bottom row of the keyboard has a period, comma, question mark, an explanation mark, and an apostrophe key. This bottom row of characters can be seen on FIG. 2, FIG. 3 and FIG. 4 also.

In FIG. 2, FIG. 3, FIG. 4, and FIG. 5 the bottom row and the command buttons all remain the same. The invention allows the user to type a letter (FIG. 2), type a number (FIG. 3), and/or type a symbol and an alpha character (FIG. 4) then choose a color key (FIG. 5) by clicking the lock key to create a complicated password.

Figure 6:
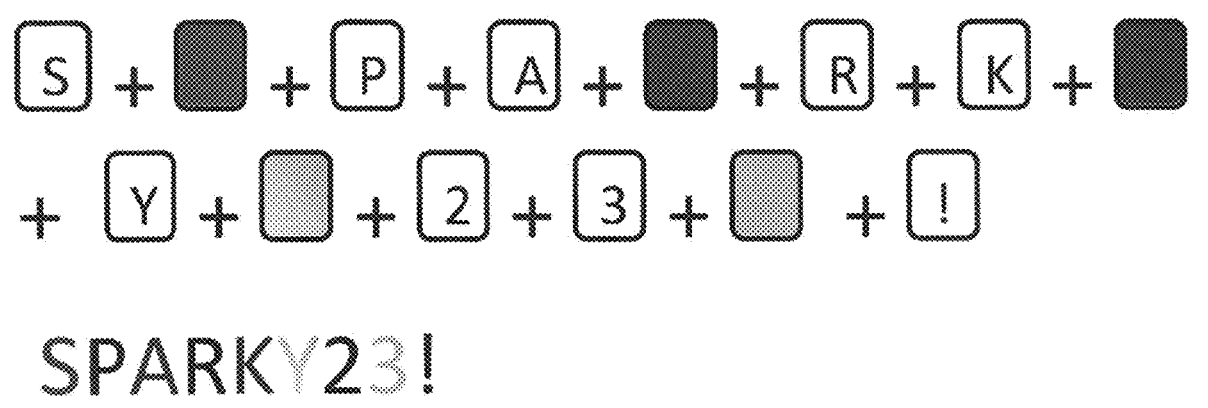

A sample password in FIG. 6 shows how the various letters, numbers, alpha characters are chosen to create a sensitive, complicated password.

Figure 8:
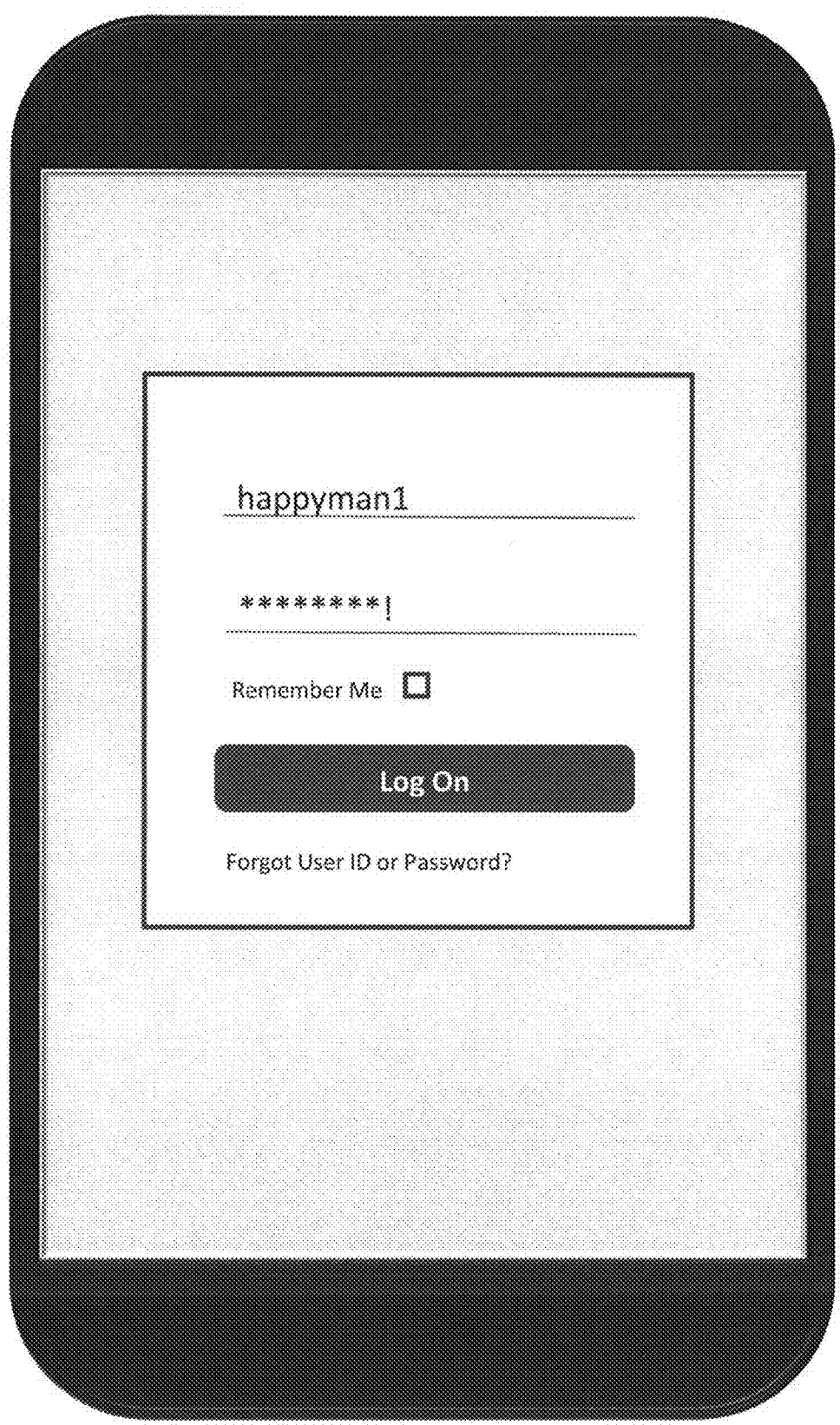

FIG. 8 shows on the cellular telephone or mobile device the resulting password when typed in has the asterisks where a user sees the typed in letter, number, symbol, or alpha character first when typed that becomes an asterisk after being typed.

This new key, the lock symbol, allows the owner or user of the cellular telephone or mobile device to create and type sensitive, complicated passwords to keep their access to data secure.

The invention claimed is:

1. A method of setting a password on a mobile device comprising:
   creating a password by:
      engaging, by a user, an alphanumeric key of an input keyboard displayed on the display of the mobile device;
      engaging, by the user, a password key on the keyboard that prompts the keyboard to display a plurality of colors keys;
      selecting and engaging, by the user, a color key from among the plurality of color keys;
      assigning, by a processor of the mobile device, a color associated with the selected color key to the engaged alphanumeric key; and
      storing a letter, number, or symbol associated with the engaged alphanumeric key in the color associated with the selected color key as at least a portion of a password, wherein the alphanumeric key, password key, and color key are selected using keyboard displayed on the mobile device.

2. The method of claim 1, wherein the plurality of color keys comprises one or more primary colors.

3. The method of claim 1, wherein the plurality of color keys comprises one or more secondary colors.

4. The method of claim 1, wherein the password key is displayed comprising an icon of a lock.

5. The method of claim 1, further comprising displaying, by the mobile device, the letter, number, or symbol associated with the engaged alphanumeric key in the color associated with the selected color key.

* * * * *